US 011808342B2

(12) United States Patent
Dawson et al.

(10) Patent No.: US 11,808,342 B2
(45) Date of Patent: Nov. 7, 2023

(54) DIFFERENTIAL CARRIER

(71) Applicant: Dana Automotive Systems Group, LLC, Maumee, OH (US)

(72) Inventors: Dakota Rene Dawson, Fort Wayne, IN (US); Steven Thomas Byrne, Holland, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/650,351

(22) Filed: Feb. 8, 2022

(65) Prior Publication Data

US 2023/0250868 A1  Aug. 10, 2023

(51) Int. Cl.
*F16H 57/037* (2012.01)
*B60K 17/16* (2006.01)

(52) U.S. Cl.
CPC ......... *F16H 57/037* (2013.01); *B60K 17/165* (2013.01)

(58) Field of Classification Search
CPC ............ F16H 57/037; F16H 57/03; F16H 2057/02052; B60B 35/166; B60B 35/163; B60B 35/16
See application file for complete search history.

(56) References Cited

U.S. PATENT DOCUMENTS

| | | | |
|---|---|---|---|
| 1,043,785 A * | 11/1912 | Miller | B60B 35/16 180/905 |
| 2,478,180 A * | 8/1949 | Buckendale | B60B 35/166 74/607 |
| 3,706,350 A | 12/1972 | Bokovoy | |
| 4,805,486 A | 2/1989 | Hagiwara et al. | |
| 5,071,392 A | 12/1991 | Stall et al. | |
| 5,220,975 A | 6/1993 | Zimmer et al. | |
| 5,676,219 A | 10/1997 | Fruhwirth et al. | |
| 5,839,327 A * | 11/1998 | Gage | F16H 57/0457 184/13.1 |
| 5,927,422 A | 7/1999 | Schakel | |
| 6,009,969 A | 1/2000 | Salcher et al. | |
| 6,094,132 A | 7/2000 | Kramer | |
| 6,336,069 B1 | 1/2002 | Hasegawa et al. | |
| 6,487,486 B1 | 11/2002 | Anderson | |
| 6,499,552 B2 | 12/2002 | Bell | |
| 6,524,207 B2 | 2/2003 | Murakami et al. | |
| 6,578,648 B2 | 6/2003 | Bell | |
| 6,648,788 B1 | 11/2003 | Sullivan | |
| 6,705,966 B2 | 3/2004 | Schröder et al. | |

(Continued)

FOREIGN PATENT DOCUMENTS

| | | | |
|---|---|---|---|
| CN | 107128128 A | * | 9/2017 |
| CN | 111070967 A | * | 4/2020 |

(Continued)

OTHER PUBLICATIONS

EPO Translation of the Description of CN 107128128 A, Zuo et al., Sep. 05, 2017. (Year: 2023).*

*Primary Examiner* — Daniel D Yabut

(74) *Attorney, Agent, or Firm* — McCoy Russell LLP

(57) ABSTRACT

An article of manufacture is provided having a differential carrier, the differential carrier including a forward surface having an input, the forward surface including a plurality of vertical ribs. In an example, the differential carrier may be used in a vehicle system for a rear differential of a drivetrain of the vehicle.

16 Claims, 4 Drawing Sheets

(56) References Cited

U.S. PATENT DOCUMENTS

| | | |
|---|---|---|
| 6,719,082 B2 | 4/2004 | Uematsu et al. |
| 6,840,882 B2 | 1/2005 | Oates et al. |
| 6,855,083 B1 | 2/2005 | Wagle et al. |
| 6,997,841 B2 | 2/2006 | Wagle et al. |
| 7,115,059 B2 | 10/2006 | Petruska et al. |
| 7,121,972 B2 | 10/2006 | Allmandinger et al. |
| 7,147,585 B2 | 12/2006 | Valente |
| 7,152,720 B2 | 12/2006 | Claussen et al. |
| 7,195,579 B2 | 3/2007 | Claussen et al. |
| 7,211,017 B2 | 5/2007 | Green et al. |
| 7,258,641 B2 | 8/2007 | Green et al. |
| 7,264,078 B2 | 9/2007 | Rodeghiero |
| 7,291,083 B2 | 11/2007 | Almaguer |
| 7,356,401 B2 | 4/2008 | Romer et al. |
| 7,686,728 B2 | 3/2010 | Imbert |
| 7,729,839 B2 | 6/2010 | Claussen et al. |
| 7,770,681 B2 | 8/2010 | Marathe et al. |
| 8,093,913 B2 | 1/2012 | Takimoto et al. |
| 8,109,174 B2 | 2/2012 | Hilker et al. |
| 8,109,853 B2 | 2/2012 | Povrick et al. |
| 8,215,725 B2 | 7/2012 | Jackson et al. |
| 8,312,956 B2 | 11/2012 | Rindfleisch |
| 8,463,511 B2 | 6/2013 | Uematsu et al. |
| 8,467,943 B2 | 6/2013 | Dersjö et al. |
| 8,523,738 B2 | 9/2013 | Morscheck et al. |
| 8,562,479 B2 | 10/2013 | Hamperl et al. |
| 8,795,125 B2 | 8/2014 | Ziech |
| 9,243,704 B2 | 1/2016 | Trost |
| 9,259,967 B2 | 2/2016 | Marsh et al. |
| 9,303,696 B2 | 4/2016 | Phelps et al. |
| 9,333,965 B2 | 5/2016 | Marsh et al. |
| 9,381,806 B2 | 7/2016 | Tavvala et al. |
| 9,382,992 B2 | 7/2016 | Vanderpool et al. |
| 9,429,222 B2 | 8/2016 | Bassi et al. |
| 9,545,927 B2 | 1/2017 | Fairgrieve et al. |
| 9,605,740 B2 | 3/2017 | Povrick et al. |
| 9,689,484 B2 | 6/2017 | Longueville et al. |
| 9,784,355 B1 | 10/2017 | Brammer et al. |
| 9,816,603 B2 | 11/2017 | Hayes et al. |
| 10,119,576 B2 | 11/2018 | Phelps et al. |
| 10,156,289 B2 | 12/2018 | De Stefani et al. |
| 10,233,976 B2 | 3/2019 | Siddaramappa et al. |
| 10,364,872 B2 | 7/2019 | Keeney et al. |
| 10,369,885 B2 | 8/2019 | Keeney et al. |
| 10,384,537 B2 | 8/2019 | Flogård et al. |
| 10,557,537 B2 | 2/2020 | Keeney et al. |
| 10,571,003 B2 | 2/2020 | Keeney et al. |
| 10,591,037 B2 | 3/2020 | Eschenburg et al. |
| 10,688,859 B2 | 6/2020 | Leach et al. |
| 2004/0022466 A1* | 2/2004 | Deschler ............... F16H 57/03 384/535 |
| 2005/0245342 A1 | 11/2005 | Pontanari et al. |
| 2006/0094558 A1* | 5/2006 | Petruska ............. F16H 57/029 475/220 |
| 2008/0085803 A1 | 4/2008 | Claussen et al. |
| 2008/0103018 A1 | 5/2008 | Peura et al. |
| 2011/0136610 A1 | 6/2011 | Gianone et al. |
| 2016/0009136 A1* | 1/2016 | Chung ................. F16H 48/42 475/230 |
| 2016/0169367 A1* | 6/2016 | Orr ..................... F16H 57/031 74/607 |
| 2016/0265647 A1* | 9/2016 | Elzib ................... F16H 57/021 |
| 2018/0297401 A1 | 10/2018 | Liu et al. |
| 2020/0096083 A1 | 3/2020 | Waltz |

FOREIGN PATENT DOCUMENTS

| | | | |
|---|---|---|---|
| DE | 19955620 A1 | 5/2001 | |
| DE | 10346113 A1 | 4/2004 | |
| DE | 10252012 A1 | 6/2004 | |
| DE | 102014014185 A1 | 4/2015 | |
| DE | 102017219545 A1 * | 5/2018 | ............ B60K 17/08 |
| JP | 2006046516 A | 2/2006 | |
| JP | 2006275164 A | 10/2006 | |
| WO | 2017114420 A1 | 7/2017 | |
| WO | 2017114422 A1 | 7/2017 | |

* cited by examiner

DIFFERENTIAL CARRIER

TECHNICAL FIELD

The invention relates to a differential carrier. More particularly, the invention relates to a differential carrier in a vehicle drivetrain with vertical supporting ribs to absorb beaming loads.

BACKGROUND AND SUMMARY

Vehicles may utilize a differential in the drivetrain. The differential may be housed in a differential carrier. While some materials may provide a lighter weight carrier, such as aluminum, the particular loads on the carrier can be problematic. For example, fatigue life due to beaming loads may compromised, requiring increased materials and thus negating expected weight savings.

The inventor has recognized the above challenges and has developed an article of manufacture including a differential carrier, the differential carrier including a forward surface having an input, the forward surface including a plurality of vertical ribs. The differential carrier may be comprised of cast aluminum. In an example, the carrier may be entirely made from cast aluminum. The plurality of vertical ribs may be asymmetrically positioned with respect to a central axis of the input.

By providing vertical ribs that may be attached to beaming ribs in an example, it may be possible to increase robustness to the carrier for absorbing beaming loads without adding excessive material and weight. Such an approach can further address fatigue degradation. While uniformly thick ribs may be used, non-uniform thickness ribs may also be used if desired.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to design of an integral type axle carrier. In an example, a carrier of a differential is strengthened through various cooperating structural elements and relative position. The carrier may be cast and may be positioned at a rear axle carrier. The carrier may include a plurality of vertical ribs. In one example, vertical ribs formed into the body of the axle carrier are attached to and reinforce a plurality of t-ribs and trunnions. Each of the plurality of vertical ribs may be cast with or machined from the axle differential carrier. The carrier may be comprised of aluminum, and in an example is completely made of aluminum, other materials and combinations of materials may be used, if desired.

Figure 1:
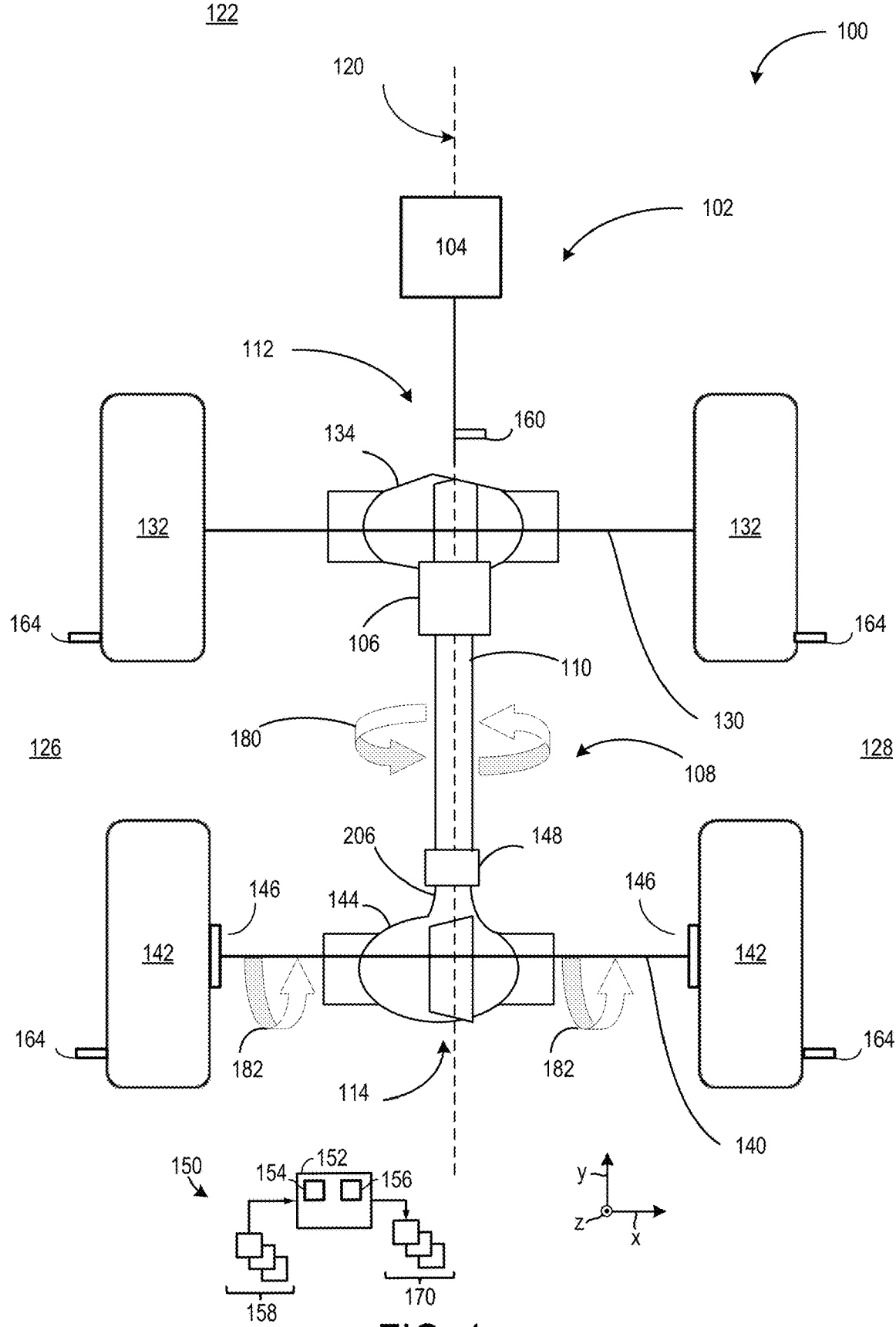
FIG. 1 schematically depicts a commercial vehicle driveline including an axle assembly according to an embodiment of the presently disclosed subject matter.

FIG. 1 shows a schematic diagram of a vehicle 100. The vehicle 100 may be a hybrid vehicle which may increase fuel efficiency. Alternatively, the vehicle 100 may include solely an internal combustion engine. The vehicle 100 may be a light, medium, or heavy duty type vehicle that may be designed for on-road and/or off-road travel.

FIG. 1 shows the vehicle 100 having a powertrain 102. The powertrain 102 includes a prime mover 104, a transmission 106, and a drivetrain 108. The vehicle 100 may comprise a prime mover 104 (e.g., an internal combustion engine, an electric motor, combinations thereof, and the like). The drivetrain 108 includes a driveshaft 110, a first axle 112, a second axle 114, and a transmission 106. A power supply, such as a prime mover 104 and/or a battery, supplies electricity to the powertrain 102, drivetrain 108, and to various components in the vehicle 100. The driveshaft 110 of the drivetrain 108 is aligned (e.g., substantially parallel, such as within 5% of parallel) with the longitudinal axis 120 (e.g., the longitudinal axis 120 is parallel with the length and concentric to the center of the driveshaft 110).

There are four regions used to reference position around the vehicle 100 described herein. The vehicle 100 may have a front side 122, a rear side 124, a left side 126, and a right side 128.

In one example, the first axle 112 of the vehicle 100 is located nominally toward the front side 122. The first axle 112 may include a first shaft 130 that couples a first pair of front wheels 132 through the front axle carrier 134. The first shaft 130 may be configured to drive a first pair of front wheels 132 of the vehicle 100. The front axle carrier 134 is located nominally in the center of the first shaft 130. The first shaft 130 are coupled to the front axle carrier 134. The first shaft 130 and the front axle carrier 134 are coupled to the transmission 106 of the vehicle 100.

In one example the second axle 114 is located near the rear side 124. The second axle 114 may include a second shaft 140 that couples a second pair of rear wheels 142 through the rear axle carrier 144. The second shaft 140 may be configured to drive a second set of rear wheels 142 of the vehicle 100. The second shaft 140 may be configured to a rear axle carrier 144. The rear axle carrier 144 may be located nominally in the center of the second shaft 140.

In one example, the first axle 112, including a first shaft 130 and front axle carrier 134, may be arranged nearer to the front side 122 of the vehicle 100 compared to the second axle 114. For this example, the second axle 114, including the second shaft 140 and rear axle carrier 144, is arranged to be nearer to a rear side 124 of the vehicle 100 than the first axle 112.

In one example, each of the second pair of rear wheels 142 is connected to the second shaft 140 via a steer axle knuckle 146. The two steer axle knuckles 146 are symmetrical across and split by a longitudinal axis 120 of the vehicle 100. In another example, one of the second set of rear wheels 142 is connected to the second shaft 140 via a steer axle knuckle 146.

FIG. 1 shows the transmission 106 as well as the first axle 112 are coupled to the driveshaft 110. The driveshaft 110 connects the transmission 106 and first axle 112 to the second axle 114. The driveshaft 110 is coupled to the second axle 114 and second shaft 140 via the rear axle carrier 144. The coupling point between the driveshaft 110 and the rear axle carrier 144 is the universal flange 148. The universal flange 148 is locate on the front side 122 facing end of the pinion nose 206 on the rear axle carrier 144.

A control system 150 with a controller 152 may be incorporated in the vehicle 100. The controller 152 includes a processor 154 and memory 156. The memory 156 may hold instructions stored therein that when executed by the processor 154 cause the controller 152 to perform the various methods, control strategies, diagnostic techniques, etc., described herein. The processor 154 may include a microprocessor unit and/or other types of circuits. The memory 156 may include known data storage mediums such as random access memory, read only memory, keep alive memory, combinations thereof, etc. The memory 156 may include non-transitory memory.

The controller 152 may receive vehicle data and various signals from sensors positioned in different locations in the vehicle 100, indicated at 158. The sensors may include a shaft speed sensor 160 and wheel speed sensor 164, etc. The controller 152 may send control signals to controllable components, indicated at 170. Additionally or alternatively, a vehicle electronic control unit (ECU) may be provided in the vehicle 100 to control other adjustable components such as the prime mover 104 (e.g., engine). The control system 150 and specifically the controller 152 with the memory 156 and processor 154 may therefore be configured to carry out the control techniques. A controller 152 may monitor inputs from sensors 160,164 to determine various operating parameters of the vehicle 100, such as vehicle speed, engine revolutions per minute (RPM), speed of the ring gear (e.g., 307 in FIG. 3), throttle position as indicated by the position of an accelerator pedal, and other parameters as set forth below.

FIG. 1 shows a rotational path of the driveshaft 110 and the second shaft 140. A driveshaft forward rotational path 180 encircles and rotates around center line concentric to the driveshaft 110. The driveshaft forward rotational path 180 forces the driveshaft 110 to turn toward the left side 126 when the prime mover 104 is driving the vehicle 100 toward the front side 122. For this example, the driveshaft forward rotational path 180 may be counter clockwise when viewed looking down the driveshaft 110 and longitudinal axis 120 from the rear side 124. Driveshaft forward rotational path 180 may be due to the ring gear (e.g., 307 in FIG. 3) being positioned to the left side 126 of the driveshaft 110 and longitudinal axis 120. If the ring gear (e.g., 307 in FIG. 3) were positioned to the right side 128 of the driveshaft 110 the driveshaft forward rotational path 180 may rotate in the opposite direction (e.g., to the right side 128 and in the clockwise direction when looking down the driveshaft 110 and longitudinal axis 120 from the rear side 124).

Figure 3:
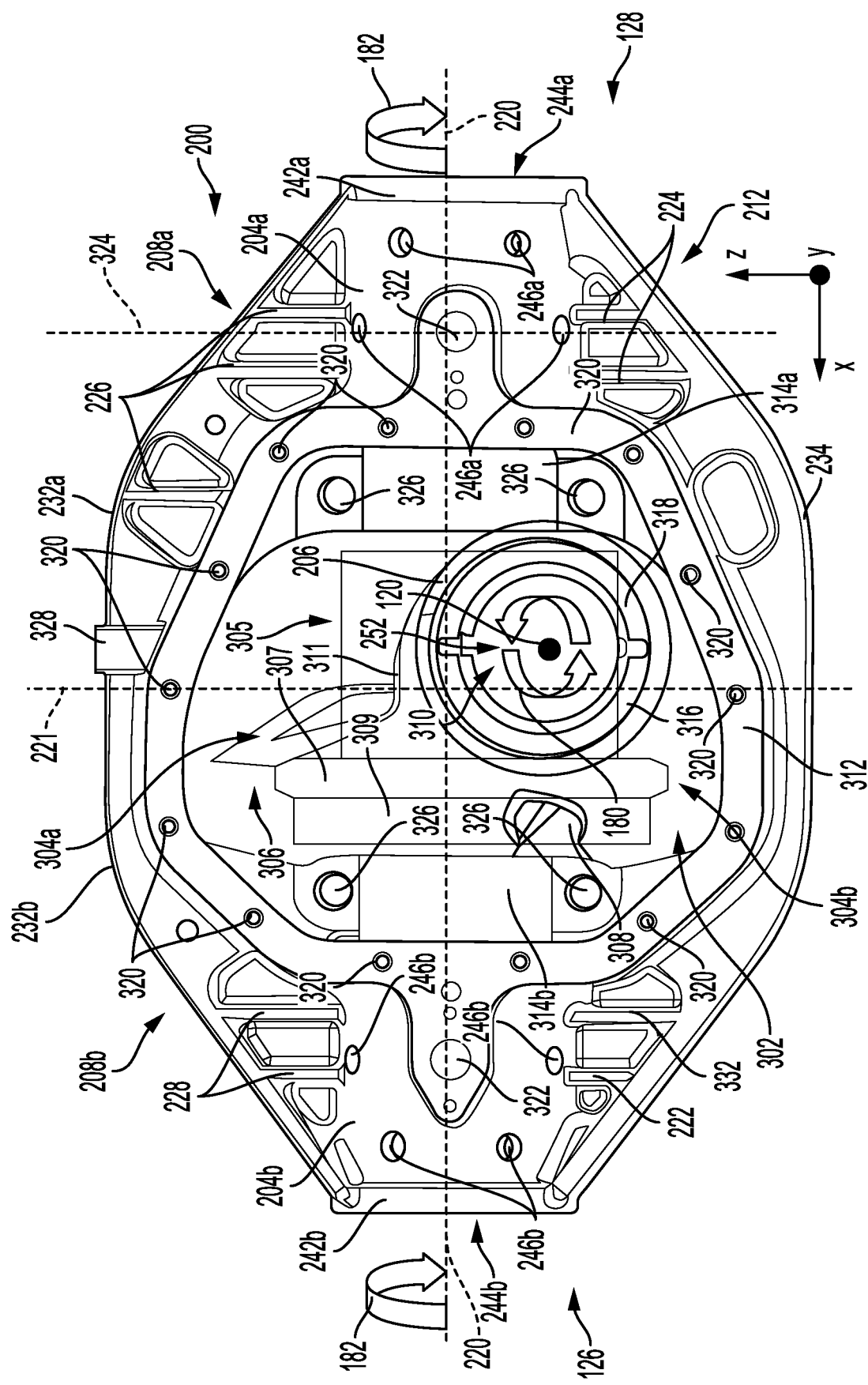
FIG. 3 is an illustration from a view of down the shaft of the axle (and along the x-axis)

The rotation of the driveshaft 110 transfers mechanical energy from the prime mover 104 to the differential gear assembly (e.g., 305 in FIG. 3). The gear assembly transfers mechanical energy into and causes the second shaft 140 to rotate. A second shaft forward rotational path 182 encircles and rotates around a center line concentric to either side of the second shaft 140. The second shaft forward rotational path 182 turns the second shaft 140 and pushes the vehicle 100 toward the front side 122. The second shaft forward rotational path 182 may be clockwise when viewed down the second shaft 140 from the right side 128. When the prime mover 104 moves the vehicle 100 in reverse, the rotational path of the driveshaft 110 and the second shaft 140 may be reversed.

Figure 2:
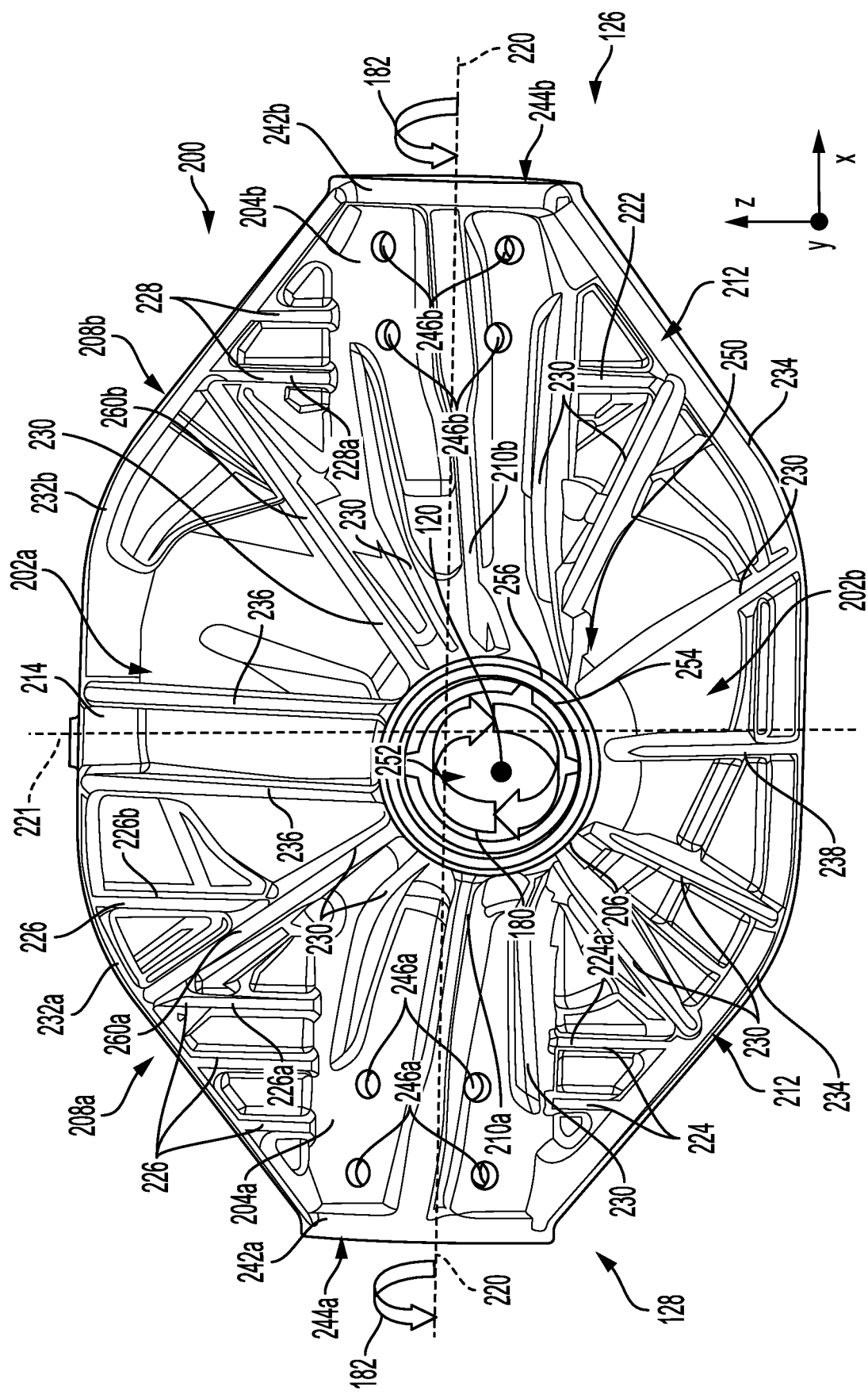
FIG. 2 is an illustrations of the cast aluminum carrier from a view down the longitudinal y-axis and (and along the beam/driveshaft)

FIG. 2 shows the front side 122 perspective of a forward surface of housing 200 of the vehicle 100. The housing 200 may be a rear beam axle carrier integral type housing, and may correspond to the rear axle carrier 144 of FIG. 1. Housing 200 may include an upper center differential housing 202a, a lower center differential housing 202b, a pair of axle trunnions 204a, 204b, and a pinion nose 206. Housing 200 may have an upper right radial web 208a, an upper left radial web 208b, and a lower radial web 212 that each extend out from the axle trunnions 204a, 204b and the center differential housing 202a, 202b. Housing 200 may have a right transverse web 210a and a left transverse web 210b that each extend out from the axle trunnions 204a, 204b, the center differential housing 202a, 202b, and the pinion nose 206. The upper right radial web 208a and upper left radial web 208b may be separated by a raised surface 214. The upper radial webs 208a, 208b may be separated from the lower radial web 212 by the axle trunnions 204a, 204b. The right transverse web 210a may be separated from the left transverse web 210b by the pinion nose 206.

FIG. 2 also shows a wheel shaft axis 220 and a vertical housing axis 221. The wheel shaft axis 220 may be concentric to and extend through the center of the pair of axle trunnions 204a, 204b and thus may be common to both trunnions. The wheel shaft axis 220 may be parallel to the x axis of FIG. 2. The wheel shaft axis 220 may align with the position of the second shaft 140, so that a wheel shaft axis 220 is concentric to the left side 126 and a right side 128 pieces of the second shaft 140. The wheel shaft axis 220 is nominally aligned with the x axis (e.g., the length of the wheel shaft axis 220 is substantially parallel with the x axis). The upper center differential housing 202a and lower center differential housing 202b may be separated by the wheel shaft axis 220. The vertical housing axis 221 may divide the housing 200 and the second shaft 140 into respective left and right sides 126, 128. The vertical housing axis 221 is nominally aligned with the z axis (e.g. the length of the vertical housing axis 221 is substantially parallel with the z axis).

FIG. 2 shows a lower left vertical rib 222, lower right vertical ribs 224, upper right vertical ribs 226, and upper left vertical ribs 228. FIG. 2 also shows vertical ribs 222, 224, 226, 228 may extend from the axle trunnions 204a, 204b and across the upper radial webs 208a, 208b and lower radial web 212 of the housing 200. The plurality of vertical ribs 222, 224, 226, 228 are nominally aligned (e.g., the lengths of the ribs are substantially parallel, such as within 5% of parallel) with the z axis. The plurality of vertical ribs 222, 224, 226, 228 may be no less than 6 mm thick. The plurality of vertical ribs 222, 224, 226, 228 may protrude off a beaming (lateral) rib or t-rib by 10 mm. The plurality of vertical ribs 222, 224, 226, 228 may protrude perpendicular from surface of the radial webs 208a, 208b, 212 by no less than 10 mm.

FIG. 2 shows a plurality of radial ribs 230 that may extend from the pinion nose 206. FIG. 2 shows an upper right t-rib 232a, an upper left t-rib 232b, and a lower t-rib 234 that compose the edges of and enclose the upper radial webs 208a, 208b and lower radial web 212. FIG. 2 also shows a pair of upper stiffening ribs 236 on the upper center differential housing 202a and a lower stiffening rib 238 on the lower center differential housing 202b.

FIGS. 2-3 show the respective upper and lower center differential housing 202a, 202b defining an upper and a lower differential housing cavity (e.g., 304a and 304b, respectively, in FIG. 3). The cavities may be configured to house a differential gear assembly (e.g., 305 in FIG. 3), portions of the pinion, and the ring gear (e.g., 307 in FIG. 3) of the differential (e.g., 309 in FIG. 3).

The axle trunnions 204a, 204b extend out from the center differential housing 202a, 202b along the wheel shaft axis 220. The axle trunnions 204a, 204b include a right axle trunnion 204a and a left axle trunnion 204b. The right axle trunnion 204a is closest to the right side 128 of the vehicle 100. The left axle trunnion 204b is closest to the left side 126 of the vehicle 100.

The right axle trunnion 204a includes a right axle trunnion ring 242a surrounding a right trunnion bore 244a on the end closest to the right side 128 of the vehicle 100. The left axle trunnion 204b includes a left axle trunnion ring 242b surrounding a left trunnion bore 244b on the end closest to the left side 126 of the vehicle 100. The right axle trunnion 204a may include right shaft housing viewing apertures 246a while the left axle trunnion 204b may include left shaft housing viewing apertures 246b. The viewing apertures 246a, 246b allow for the axle housing housed within the axle trunnions 204a, 204b to be observed for repair or maintenance purposes.

The second shaft 140 may align (e.g., substantially parallel, such as within 5% of parallel) with the wheel shaft axis 220 and the length of the trunnion bores 244a, 244b. The alignment is so that the wheel shaft axis 220 may be concentric and parallel to the second shaft 140. The alignment is also so that the second shaft 140 may be parallel with the length of and concentric to the right trunnion bore 244a and the left trunnion bore 244b.

FIG. 2 shows the pinion nose 206 extending from the center differential housing 202a, 202b toward the front side 122 of the vehicle 100. The pinion nose 206 defines a pinion shaft chamber (e.g., 310 in FIG. 3) configured to house a pinion shaft assembly, which is configured to couple to a driveshaft 110. A pinion housing 250 comprises the pinion nose 206 and a portion of the center differential housing 202a, 202b. The pinion housing 250 houses a pinion and a pinion shaft enclosed by the housing 200. The center of the pinion nose 206 is defined by a universal flange/driveshaft bore 252. A universal flange/driveshaft bore 252 may house the universal flange 148. The universal flange 148 may be coupled to the pinion shaft, the pinion nose 206, and the driveshaft 110 while housed in the universal flange/driveshaft bore 252, serving as an input to the differential (e.g., 309 in FIG. 3). The center of the pinion nose 206 and universal flange/driveshaft bore 252 is aligned (e.g., the length of the universal flange/driveshaft bore 252 is substantially parallel, such as within 5% of parallel) with the longitudinal axis 120 of the vehicle 100 (e.g., so that the longitudinal axis 120 is concentric to the pinion nose 206 and universal flange/driveshaft bore 252 and thus is a central axis of the input). The interior of the universal flange/driveshaft bore 252 may be lined with an oil seal 254 and an outer pinion bearing 256. The oil seal 254 prevents oil that lubricates the pinion shaft from leaking out of the universal flange/driveshaft bore 252. The outer pinion bearing 256 supports the pinion shaft and the universal flange 148.

FIG. 2 show that with the universal flange/driveshaft bore 252, the driveshaft forward rotational path 180 appears to rotate clockwise around the longitudinal axis 120. The seeming flip in rotation may be due to the positioning of the view of FIG. 2 (e.g., looking down the driveshaft 110 and longitudinal axis 120 from the front side 122).

FIG. 2 shows the upper right radial web 208a may be formed on the right axle trunnion 204a. The upper right radial web 208a may extend angularly from the right axle trunnion 204a toward the upper center differential housing 202a and the left side 126. The upper right radial web 208a may curve around and into the upper center differential housing 202a until terminating at the raised surface 214 and upper stiffening ribs 236 closest to the right side 128. FIG. 2 shows the upper left radial web 208b is formed on the left axle trunnion 204b. The upper left radial web 208b may extend angularly from the left axle trunnion 204b toward the upper center differential housing 202a and right side 128. The upper left radial web 208b may curve around and into the upper center differential housing 202a until terminating at the raised surface 214. The lengths of the upper radial webs 208a, 208b may be substantially parallel to the wheel shaft axis 220. The lengths of the upper radial webs 208a, 208b may be substantially perpendicular to the longitudinal axis 120.

FIG. 2 shows the lower radial web 212 may be formed on and extend from the right axle trunnion 204a, toward and around the lower center differential housing 202b, and terminating into the material of the left axle trunnion 204b. The radial web may also be viewed as forming and extending out from the left axle trunnion 204b and terminating into the right axle trunnion 204a. A lower stiffening rib 238 may support the center of the lower radial web 212. Lower radial web 212 may extend from the right axle trunnion 204a and left axle trunnion 204b at a location diametrically opposed from upper radial webs 208a, 208b. The length of the lower radial web 212 may be substantially parallel to the wheel shaft axis 220. The length of the lower radial web 212 may be perpendicular to or generally perpendicular to longitudinal axis 120.

The upper radial webs 208a, 208b and lower radial web 212 prevent vertical deflection (e.g., in a direction generally orthogonal to longitudinal axis 120 and the wheel shaft axis 220). The upper radial webs 208a, 208b and lower radial web 212 prevent fore/aft deflection (e.g., in a direction generally parallel to the longitudinal axis 120). The upper radial webs 208a, 208b and lower radial web 212 provide additional stiffness to center differential housing 202a, 202b.

FIG. 2 shows that the right transverse web 210a and left transverse web 210b are formed on and extend from opposite sides of center differential housing 202a, 202b and pinion nose 206. The right transverse web 210a may extend angularly from center differential housing 202a, 202b front end and the pinion nose 206 to the right axle trunnion 204a. The left transverse web 210b may extend angularly from center differential housing 202a, 202b front end and the pinion nose 206 to the left axle trunnion 204b. The right transverse web 210a and left transverse web 210b form along a plane substantially parallel to the longitudinal axis 120 and the wheel shaft axis 220. The respective right and left transverse webs 210a, 210b prevent torsional deflection of the housing 200 and provide additional stiffness thereto. The respective right and left transverse webs 210a, 210b provide additional support and stiffness to the pinion nose 206.

FIG. 2 shows the upper right radial web 208a may be supported by the upper right vertical ribs 226, the plurality of radial ribs 230, the upper right t-rib 232a, and the upper stiffening ribs 236. FIG. 2 shows the upper left radial web 208b may be supported by the upper left vertical ribs 228, the plurality of radial ribs 230, the upper left t-rib 232b, and the upper stiffening ribs 236. FIG. 2 shows the lower radial web 212 may be supported by the lower left vertical rib 222, lower right vertical ribs 224, the plurality of radial ribs 230, the lower t-rib 234, and the lower stiffening rib 238. FIG. 2 shows the axle trunnions 204a, 204b may be supported by a plurality of vertical ribs 222, 224, 226, 228, a plurality of radial ribs 230, and t-ribs 232a, 232b, 234. FIG. 2 shows the pinion nose 206 may be supported by a plurality of radial ribs 230, upper stiffening ribs 236, and a lower stiffening rib 238. The plurality of vertical ribs 222, 224, 226, 228 offer increases strength while decreasing the weight and casting material required for the radial webs 208a, 208b, 212.

FIG. 2 shows the lower left vertical rib 222 may extend from the left axle trunnion 204b, across the lower radial web 212, and to the lower t-rib. The lower left vertical rib 222 may also fuse to an intersection of a radial rib 230 and the lower t-rib 234. The lower right vertical ribs 224 extend from the right axle trunnion 204a, across the lower radial web 212, and to the lower t-rib 234. The upper right vertical ribs 226 extend from the right axle trunnion 204a, across the upper right radial web 208a, and to the upper right t-rib 232a. The upper left vertical ribs 228 extend from the left axle trunnion 204b, across the upper left radial web 208b, and to the upper left t-rib 232b.

FIG. 2 shows radial ribs 230 may expand outward from the pinion nose 206 and onto the right axle trunnion 204a or left axle trunnion 204b, and/or the radial ribs 230 may expand outward from the pinion nose 206 and onto the upper right radial web 208a, upper left radial web 208b, or the lower radial web 212. Radial ribs 230 that expand from the pinion nose 206 along the axle trunnions 204a, 204b, may diminish into the material of the axle trunnions 204a, 204b. Radial ribs 230 that expand from the pinion nose 206 across the upper center differential housing 202a and along the upper right radial web 208a, may terminate at the upper right t-rib 232a. Radial ribs 230 that expand from the pinion nose 206 across the upper center differential housing 202a and along the upper left radial web 208b, may terminate at the upper left t-rib 232b. Radial ribs 230 that expand from the pinion nose 206 across the lower center differential housing 202b and along the lower radial web 212, may terminate at the lower t-rib 234. T-ribs 232a, 232b, 234 surround the edges of the radial webs 208a, 208b, 212. The upper right t-rib 232a composes the edge of and supports the upper right radial web 208a. The upper left t-rib 232b composes the edge of and supports the upper left radial web 208b. The lower t-rib 234 composes the edge of and supports the lower radial web 212.

FIG. 2 shows for this example a greater plurality of radial ribs 230 and vertical ribs 222, 224, 226, 228 are present on the right side 128 when compared to the left side 126 of the housing 200. A greater quantity of radial ribs 230 may be present on the lower center differential housing 202b and lower radial web 212 compared to upper center differential housing 202a and upper radial webs 208a, 208b. The radial ribs 230 may also extend from the pinion nose at lower angles on the left side 126 compared to the right side 128 of the housing 200. For example, a right example radial rib 260a extends out toward an upper right t-rib 232a at a higher angle than a left example radial rib 260b toward the upper left t-rib 232b.

The structural placement of the ribs may be with an asymmetrical shape due to the placement of the differential gear assembly (e.g., 305 in FIG. 3), and the forces producing the torque of the driveshaft 110 while rotating. The shape of the housing 200 is asymmetrical to accommodate the differential gear assembly (e.g., 305 in FIG. 3) and to reduce casting material required for and weight of the housing 200. For example, when driving the vehicle 100 forward and with regard to the differential carrier being positioned at a rearward axle of the vehicle 100, with the shafts rotating as illustrated in FIGS. 1-2, for example, increased loads, including beam loads, may be experienced on the right side 128. As such, in this example, an increased density of vertical ribs 222, 224, 226, 228 is positioned on the right side 128 of the differential carrier.

A ring gear (e.g., 307 in FIG. 3) of a differential gear assembly (e.g., 305 in FIG. 3) may be to or substantially to the left side 126 of the driveshaft 110 and pinion. To accommodate the ring gear (e.g., 307 in FIG. 3) and differential gear assembly (e.g., 305 in FIG. 3), the respective upper and lower center differential housing 202a, 202b may be substantially shifted toward the left side 126 of the housing 200. FIG. 2 shows the wheel shaft axis 220 and axle trunnions 204a, 204b may be located slightly above the universal flange/driveshaft bore 252 and pinion. The second shaft 140 may be concentric to the axle trunnions 204a, 204b and therefore slightly above the universal flange/driveshaft bore 252 and pinion. The second shaft 140 may support and position the differential gear assembly (e.g., 305 in FIG. 3) substantially in the upper center differential housing 202a.

Torque from the rotation of the driveshaft 110 may be distributed into the front side 122 of the housing 200, primarily into the pinion nose 206. The plurality of radial ribs 230 are may help distribute the forces and vibrations produced by the torque away from the pinion nose 206. Distributing forces and vibrations from the torque reduces strain and ware on the pinion nose 206. However, the components of and the differential gear assembly (e.g., 305 in FIG. 3) may be sensitive to external forces. For one example, vibrations from the torque of the driveshaft 110 from a heavy load carried by or drastic variations speed of the vehicle 100, may cause misalignment of components in the differential gear assembly (e.g., 305 in FIG. 3). For another example, consistent forceful impacts from uneven terrain may cause misalignment or other damage to the differential gear assembly (e.g., 305 in FIG. 3). To prevent misalignment or damage, radial ribs 230 may be used to distribute force and vibrations from the torque or variables external to the vehicle 100 away from the differential gear assembly (e.g., 305 in FIG. 3).

FIG. 2 shows a right example radial rib 260a and a left example radial rib 260b. FIG. 2 shows the right example radial rib 260a may be substantially on the upper right radial web 208a and a greater distance from the right axle trunnion 204a. Forces and vibrations from the torque of the right example radial rib 260a may be distributed onto the web. FIG. 2 shows the left example radial rib 260b may include a larger portion on the upper center differential housing 202a due to the position of the differential gear assembly (e.g., 305 in FIG. 3). Additionally, FIG. 2 shows that the left example radial rib 260b may be closer to the left axle trunnion 204b. The placement of the left example radial rib 260b may help distribute forces and vibrations into or closer to the axle trunnion, and away from the differential gear assembly (e.g., 305 in FIG. 3). FIG. 2 also shows a greater quantity of radial ribs cross the lower center differential housing 202b and lower radial web 212 where less of the differential gear assembly (e.g., 305 in FIG. 3) may be positioned. The greater quantity of radial ribs may transfer substantial forces and vibrations from the torque of driveshaft 110 to the upper right radial web 208a and/or the right side 128 of the lower radial web 212. Increase in forces and vibrations on the on the upper right radial web 208a and/or the right side 128 of the lower radial web 212 from the plurality of radial ribs, may result in greater ware and strain. The upper right radial web 208a and/or right side 128 of the lower radial web 212, may have a greater possibility of chronic or acute ware or damage to the structural integrity of the housing 200. A greater plurality of lower right vertical ribs 224 and upper right vertical ribs 226 may be used to increase the strength of the upper right radial web 208*a* and/or the right side 128 of the lower radial web 212. For example, there may be four upper right vertical ribs 226 on the upper right radial web 208*a* compared to two upper left vertical ribs 228 on the upper left radial web 208*b*. For another example, there may be two lower right vertical ribs 224 on the right side 128 of the lower radial web 212 compared to a single lower left vertical rib 222 on the left side 126 of the lower radial web 212.

FIG. 2 shows the lower radial web 212 possesses a greater plurality of radial ribs 230 when compared to the upper radial webs 208*a*, 208*b*. Due to a greater plurality and more even placement of radial ribs 230, the lower radial web 212 may experience less uneven forces or strain. The greater plurality and even placement of radial ribs 230 may also provide greater structural strength to the lower radial web 212. There may be fewer required lower left vertical ribs 222 and lower right vertical ribs 224 as a plurality of radial ribs 230 may reduce uneven forces and increase structural strength to the lower radial web 212. For example, there may be two lower right vertical ribs 224 on the right side 128 of the lower radial web 212 compared to four upper right vertical ribs 226 on the upper right radial web 208*a*. For example, there may be a single lower left vertical rib 222 on the left side 126 of the lower radial web 212 compared to two upper left vertical ribs 228 on the upper left radial web 208*b*.

The plurality of vertical ribs 222, 224, 226, 228 may also distribute forces transferred from the radial webs 208*a*, 208*b*, 212 to the t-ribs 232*a*, 232*b*, 234, and axle trunnions 204*a*, 204*b*. A plurality of vertical intersecting ribs 222, 224*a*, 226*a*, 226*b*, 228*a* may intersect with and distribute forces from radial ribs 230 and t-ribs 232*a*, 232*b*, 234 to the axle trunnions 204*a*, 204*b*. Vertical ribs 222, 224, 226, 228 that intersect with radial webs 208*a*, 208*b*, 212 may include the lower left vertical rib 222, a lower right vertical intersecting rib 224*a*, a first upper right vertical intersecting rib 226*a*, a second upper right vertical intersecting rib 226*b*, and an upper left vertical intersecting rib 228*a*. Likewise vertical ribs 222, 224, 226, 228 may distribute forces and vibrations in the axle trunnions 204*a*, 204*b* to the upper radial webs 208*a*, 208*b* and lower radial web 212.

FIG. 2 shows a pair of upper stiffening ribs 236 and a lower stiffening rib 238 on the front side 122 of the housing 200. The upper stiffening ribs 236 and lower stiffening rib 238 extend from the pinion nose 206 like the radial ribs 230. Unlike the radial ribs 230, the upper stiffening ribs 236 and lower stiffening rib 238 are vertically aligned (e.g., the length of the ribs are substantially parallel with the z axis). The upper stiffening ribs 236 extend from the pinion nose to the raised surface 214. The raised surface 214 divides the upper right radial web 208*a* from the upper left radial web 208*b*. The lower stiffening rib 238 may extend from the pinion nose 206, across the lower center differential housing 202*b* and lower radial web 212, to the lower t-rib 234. The upper stiffening ribs 236 provide additional support to the upper center differential housing 202*a*. The lower stiffening rib 238 may provide additional support to the lower center differential housing 202*b*.

FIG. 3 shows a rear side 124 perspective of the housing 200 of the vehicle 100. A rear opening 302 is a prominent feature of FIG. 3. An upper differential housing cavity 304*a* and a lower differential housing cavity 304*b* may be visible from within the rear opening 302. The upper differential housing cavity 304*a* and the lower differential housing cavity 304*b* may be divided by the wheel shaft axis 220. A ring gear cavity 306 may be visible in the upper differential housing cavity 304*a*. A lower differential support 308 may be visible as depressions within the lower differential housing cavity 304*b*. An upper differential support 311 may be visible as a cutout in the upper differential housing cavity 304*a*.

FIG. 3 shows a pinion shaft chamber 310 within the lower differential housing cavity 304*b*. FIG. 3 shows a differential gasket surface 312 may encircle the rear opening 302, where the gasket surface also forms a mounting surface. A right partial differential bearing 314*a* and a left partial differential bearing 314*b* are located between the rear opening 302 and the differential gasket surface 312 is a. FIG. 3 shows the right axle trunnion 204*a* and the left axle trunnion 204*b* are extend from the differential gasket surface 312 to the right side 128 and left side 126, respectively. Extending out from the axle trunnions 204*a*, 204*b* and surrounding the differential gasket surface 312 are the upper radial webs 208*a*, 208*b* and the lower radial web 212.

A differential gear assembly 305 may be housed in the differential housing cavities 304*a*, 304*b* of the housing 200. The ring gear cavity 306 provides clearances so that a ring gear 307 of the differential gear assembly 305 may be able to rotate without locking or grinding against the material of the housing 200. The lower differential support 308 is an indentation in the housing 200 where a portion of the differential gear assembly 305 and carrier may be mounted for additional support. The upper differential support 311 is a cut out where a portion of the differential gear assembly 305 and carrier may be mounted for additional support. The differential gear assembly 305 may also be supported by the partial differential bearings 314*a*, 314*b*, and the left and right portions of the second shaft 140.

FIG. 2. Shows a ring gear 307 may rest on a differential 309 of the differential gear assembly 305. The differential 309 may support and be concentric to the ring gear 307. The differential 309 may be smooth so the ring gear 307 may rotate with greater ease. The wheel shaft axis 220 and the second shaft 140 may be concentric the ring gear 307 and the differential 309. The ring gear 307 may be to the left side 126 of the pinion shaft chamber 310, pinion nose 206, universal flange/driveshaft bore 252, and longitudinal axis 120. The second shaft 140 may not be a continuous rod. Instead, the second shaft 140 may be divided to a section closer to the left side 126 and a section closer to the right side 128 of nominally equal length (e.g., length in of the second shaft 140 in the x direction with slight variation, such as within 5%).

For one example, the second shaft 140 may extend into center of the housing 200. For this example, the left side 126 and right side 128 of the second shaft 140 may terminate to the right of the ring gear 307 and differential 309 within the differential gear assembly 305. For this example, the left side 126 and right side 128 of the second shaft 140 may be equidistantly spaced from the vertical housing axis 221. For this example, there may be side gears directly coupled to the second shaft 140.

For another example, the left side 126 and right side 128 of the second shaft 140 may be coupled to another differential shaft part of the differential gear assembly 305 near the partial differential bearings 314*a*, 314*b*. For this example, the left side 126 and right side 128 of the second shaft 140 and the differential shaft may be separated by the vertical housing axis 221. For this example, the side gears may be coupled to the differential shaft. For this example, the left side 126 and right side 128 of the differential shaft may terminate to the right of the ring gear 307 and differential 309 within the differential gear assembly 305. For this example, the side gears, the left side 126, and the right side 128 of the differential shaft may equidistant from the vertical housing axis 221. For this example, the left side 126 of a differential shaft and the second shaft 140 may be coupled together. For this example, and right side 128 of a differential shaft and the second shaft 140 may be coupled together.

The differential gear assembly 305 may include other gears, such as spider gears and side gears. A plurality of spider gears may be coupled to the ring gear 307 via appendages. In some examples, there may be an even number of spider gears to balance the load and more evenly distribute the torque from the wheel gear. In one example there may be a plurality of two spider gears. In another example, there may be a plurality of four spider gears. The plurality of spider gears may have an axis concentric to their radial center that may be perpendicular to the wheel shaft axis 220. The spider gears may have two degrees of motion. In the first degree of motion, the plurality of spider gears may rotate with the ring gear 307 around the wheel shaft axis 220. In the second degree of motion, the spider gears may also rotate around the axis concentric to the radial center of the spider gears. Side gears may interlock with the teeth of the spider gears. The wheel shaft axis 220 may be concentric to the side gears. The side gears may be incorporated into the differential gear assembly 305 in a plurality of ways. For one example, the side gears may be coupled directly to the left side 126 and right side 128 of the second shaft 140. For another example, the left side 126 and right side 128 of the second shaft 140 may be coupled to the left side 126 and right side 128 a separate differential shaft within the differential gear assembly 305 and differential housing cavities 304a, 304b along the wheel shaft axis 220. For this example, the left side 126 and right side 128 of the differential shaft may be coupled to respective sides of the second shaft 140. The rotation of the side gears drives the second shaft 140 and the rear wheels 142 to rotate.

If the plurality of spider gears rotates with the ring gear 307 in the first degree of motion and not the second degree of motion, the left side 126 and right side 128 of the side gears will move at the same speed. If different speeds are required for each of the rear wheels 142, such as in a turn, the spider gear may rotate in a second degree of motion. The spider gear may rotate clockwise or counter clockwise around the axis concentric to the radial center of the spider gears. The rotation around the axis concentric to radial center of the spider gear cause the plurality of side gears to rotate at different speeds. For example, a spider gear may rotate counter clockwise. For this example, the counter clockwise rotation of the spider gear adds mechanical energy in the same direction to the side gear on the right side 128. For this example, the counter clockwise rotation of the spider gear adds mechanical energy in the opposite to the side gear on the left side 126. For this example, the side gear on the right side 128 may rotate faster due to having additional force from the spider gear. For this example, the side gear on the left side 126 may rotate slower due to having to work against the force from the spider gear. For this example, the left side 126 may move slower than the right side 128 of the second shaft 140 and rear wheels 142. The difference in speed for the rear wheels 142 allows for the vehicle 100 to turn smoothly.

FIG. 3 shows an inner pinion shaft bearing 316 within the pinion shaft chamber 310. The inner pinion shaft bearing 316 is located at the mouth of the pinion nose 206 and pinion shaft chamber 310. The inner pinion shaft bearing 316 encircles and supports a pinion shaft. A shim adjustment 318 decreases the diameter of pinion shaft chamber 310 into the universal flange/driveshaft bore 252. Within the shim adjustment 318 may be a shim. The shim may further help to support the pinion shaft and/or the universal flange 148. The inner pinion shaft bearing 316 encircles a section of pinion shaft chamber 310 before the shim adjustment 318.

On the end of the pinion shaft facing the rear side 124 may be a pinion gear. The teeth of the pinion gear may interlock with the ring gear 307. As the pinion is turned by the driveshaft 110, the pinion may transfer mechanical energy into ring gear 307. The mechanical energy transferred may force the ring gear 307 to rotate around the wheel shaft axis 220. For one example, the vehicle 100 moves toward the front side 122 under power from the prime mover 104. For this example, the pinion shaft and pinion gear may rotate with driveshaft 110 along the driveshaft forward rotational path 180. For this example, as pinion gear rotates, the mechanical energy may force the ring gear 307 to rotate in the direction of the second shaft forward rotational path 182. For this example, the spider gears rotate with the ring gear 307. For this example, the rotation of the plurality of spider gears transfer mechanical energy into and force the side gears and by extension the second shaft 140 to rotate along the second shaft forward rotational path 182. The rotation of the second shaft 140 turns the rear wheels 142 and moves the vehicle 100 toward the front side 122. The rear opening 302 may be encircled by a differential gasket surface 312 forming an opening and for receiving a differential gasket. The differential gasket acts as a seal between the housing 200 and rear flange. The differential gasket prevents oil or other forms of lubricant used for the differential gear assembly 305 and second shaft 140 from leaking out of the rear opening 302. The differential gasket surface 312 contains a plurality of rear flange coupling apertures 320. The rear flange coupling apertures 320 may fasten the rear flange to the differential gasket surface 312. The rear flange coupling apertures 320 aide to sealing and supporting the rear opening 302 and differential into the housing 200. FIG. 3 shows the differential gasket surface 312 also contains a plurality of axle housing mounting apertures 322 located on the right axle trunnion 204a and left axle trunnion 204b. The axle housing mounting apertures 322 are used to secure the axle housing to the interiors of the right axle trunnion 204a and left axle trunnion 204b, and within the right trunnion bore 244a and left trunnion bore 244b. A vertical cutout view plane 324 divides an axle housing mounting aperture 322 on the right axle trunnion 204a along a centerline. The vertical cutout view plane 324 divides the housing 200 for the cutout view in FIG. 4A.

FIG. 3 shows a pair of respective right and left partial differential bearings 314a, 314b may be between the differential gasket surface 312 and rear opening 302. There may be a right partial differential bearing 314a closer to the right side 128 and a left partial differential bearing 314b closer to the left side 126. Both partial differential bearings 314a, 314b may support the second shaft 140 and by extension differential gear assembly 305 housed within the differential housing cavities 304a, 304b. The partial differential bearings 314a, 314b may contain differential bearing cap mounting apertures 326. The differential bearing cap mounting apertures 326 may allow for a differential cap to be fastened to the partial differential bearings 314a, 314b to form differential bearings and seal the differential gear assembly 305 and second shaft 140 into the center differential housing 202a, 202b. The partial differential bearings 314a, 314b and the bearing caps support the differential gear assembly 305 and the left side 126 and right side 128 rear drive axle of the second shaft 140.

A rear side upper support rib 328 connects the differential gasket surface 312 to the upper right t-rib 232a, upper left t-rib 232b, and the raised surface 214 shown in FIG. 2. FIG. 3 shows the vertical ribs 222, 224, 226, 228 are visible through the upper right radial web 208a, upper left radial web 208b, and lower radial web 212 from the rear side 124 of the housing 200. FIG. 3 shows that an additional lower left vertical rib 332 is visible from the rear side 124 of the housing 200. The radial ribs 230, the upper stiffening ribs 236, and lower stiffening rib 238 may be visible on the front side 122 and not the rear side 124 of the housing 200.

Figure 4A:
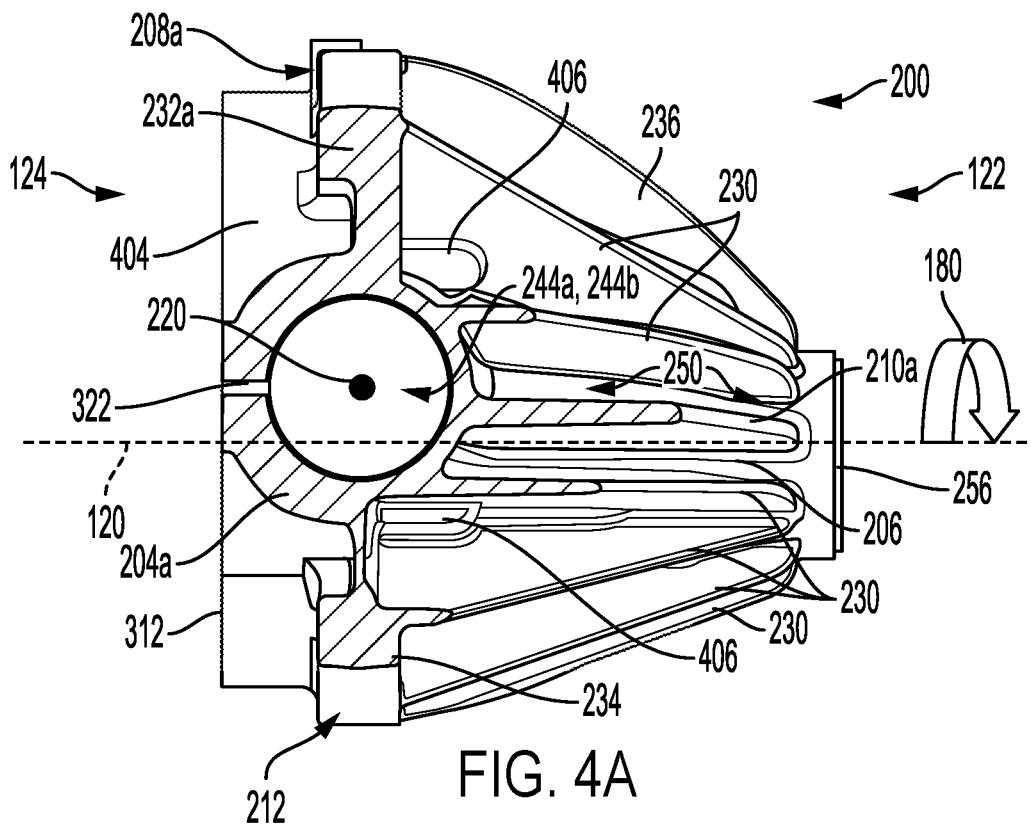
FIGS. 4A-4B are side illustrations of the differential carrier of FIGS. 2-3.
Figure 4B:
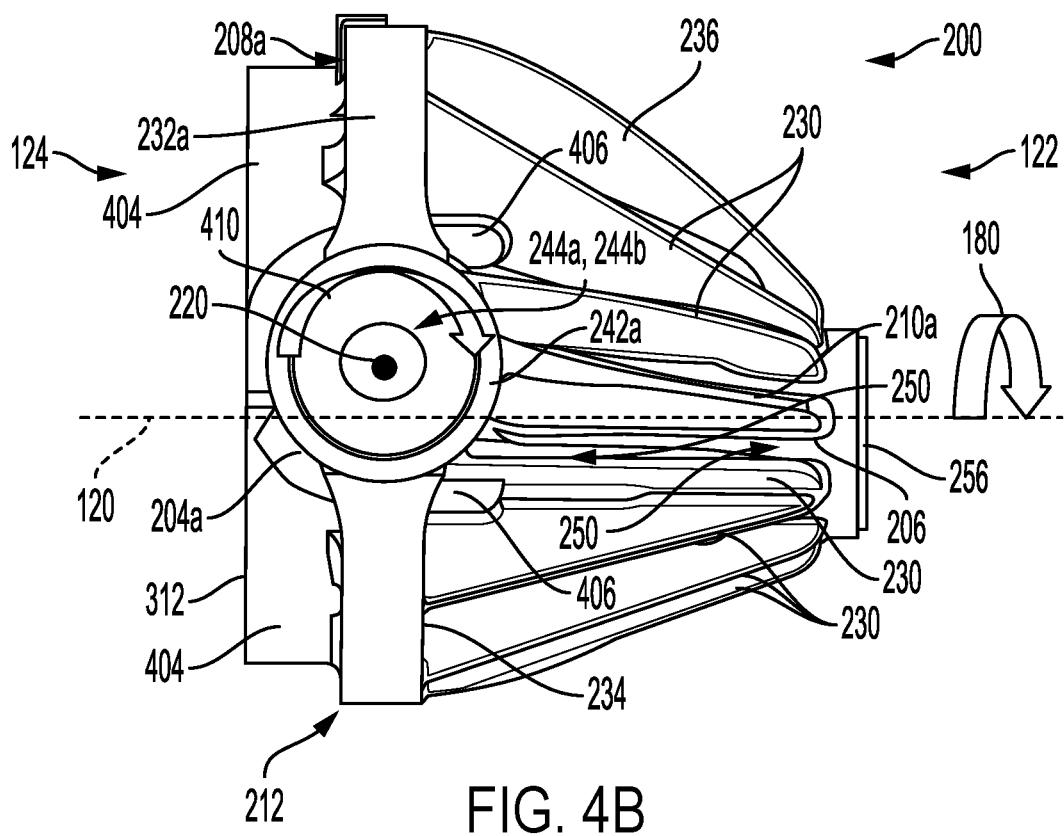

FIG. 4A and FIG. 4B offer two views from the right side 128 (e.g., looking down the wheel shaft axis 220 from the right side 128) of the housing 200. FIG. 4A is the perspective from a cutout made at a vertical cutout view plane 324 of the axle housing mounting aperture 322 on the right axle trunnion 204a. FIG. 4B is the perspective from the edge of the right axle trunnion ring 242a.

FIG. 4A and FIG. 4B show a view of the right trunnion bore 244a and by extension the left trunnion bore 244b from the right wheel side. FIG. 4A and FIG. 4B show that a housing flange 404 may extend from the rear side 124 of the housing 200. The differential gasket 312 may be affixed to the longitudinally aligned surface (e.g., wherein the longitudinal axis 120 is substantially perpendicular to the surface at 90°/180° or similar angle with slight variation, such as within 5%) of the housing flange 404. FIG. 4A and FIG. 4B also show cap mounting aperture extensions 406 that extend the depth (e.g., the depth of the bore in the y direction or substantially parallel to the longitudinal axis 120) of the differential bearing cap mounting apertures 326. The cap mounting aperture extensions 406 extend the depth of the differential bearing cap mounting apertures 326 beyond the depth of the upper right radial web 208a and upper left radial web 208b. The cap mounting aperture extensions 406 allow for a fastener—such as bolt—to extend through the differential bearing cap mounting apertures 326 and beyond the diameter of the partial differential bearings 314a, 314b and/or differential bearings. The longer fastener provides additional support for the differential bearing caps and partial differential bearings 314a, 314b when combined into differential bearings. The support from the longer fastener helps prevent the shifting weight of the differential gear assembly 305 and second shaft 140 from detaching and/or damaging the differential bearing cap and/or partial differential bearings 314a, 314b. The length and width of the cap mounting aperture extensions 406 are arbitrary. Other fasteners, substitutes for cap mounting aperture extensions 406, and configurations either may be used, if desired.

FIG. 4A shows a cutout of the axle housing mounting apertures 322, the upper right t-rib 232a, the upper right radial web 208a, and the right transverse web 210a.

FIG. 4B shows an axle forward rotational path 410 within the right trunnion bore 244a and right axle trunnion ring 242a. The axle forward rotational path 410 is the rotational path of the axle when the vehicle 100 is traveling in the direction of the front side 122. The axle forward rotational path 410 may spin the second shaft 140 in the clockwise direction around the wheel shaft axis 220, when viewed down the wheel shaft axis 220 from the right side 128. The axle forward rotational path 410 follows the same path as second shaft forward rotational path 182.

FIG. 4A and FIG. 4B show the pinion nose 206 may extend toward the front side 122 of and along the longitudinal axis 120 of the vehicle 100. FIG. 4A and FIG. 4B show the outer pinion bearing 256 may extend slightly out from the pinion nose 206 and toward the front side 122 of the vehicle 100.

FIG. 4A and FIG. 4B show a plurality of radial ribs 230 and the right transverse web 210a. From the perspective of FIG. 4A and FIG. 4B, the plurality of radial ribs 230 and the right transverse web 210a may have a high surface area. FIG. 4A shows that the plurality of radial ribs 230 and the right transverse web 210a have a thick cross-section indicating substantial amount of casting material. The plurality of radial ribs 230, the right transverse web 210a, and the left transverse web 210b increase in thickness when approaching the radial webs 208a, 208b, 212. The plurality of radial ribs 230 and the left transverse web 210b closer to the left side 126 share similar structural and surface area properties to the plurality of radial ribs 230 and right transverse web 210a on the right side 128.

The high surface area of the plurality of radial ribs, the right transverse web 210a, and the left transverse web 210b may promote heat exchange to prevent overheating, thermal deformation, and other forms of temperature induced degradation to the differential gear assembly 305 and the housing 200, or other components of the drivetrain 108. Heat exchange and removal may be further aided by high coefficient thermal exchange of the aluminum used to cast the housing 200.

The thickness of the radial ribs 230, the right transverse web 210a, and the left transverse web 210b increases upon approaching the radial webs 208a, 208b, 212. The increasing thickness of the plurality of radial ribs 230, the right transverse web 210a, and the left transverse web 210b may increase structural support for the pinion nose 206 and pinion housing 250. The increasing thickness of the plurality of radial ribs 230, the right transverse web 210a, and the left transverse web 210b may increase the structural support of the pinion nose 206. The thickness of the plurality of radial ribs 230, the right transverse web 210a, and the left transverse web 210b may increase the structural support of the center differential housing 202a, 202b. The thickness of the plurality of radial ribs 230, the right transverse web 210a, and the left transverse web 210b may increase the structural support of the upper radial webs 208a, 208b, and the lower radial web 212. The thickness of the plurality of radial ribs 230, the right transverse web 210a, and the left transverse web 210b may increase the structural support of the housing 200.

In an example, a differential carrier described herein is comprised of cast aluminum. In an example, a differential carrier consists of cast aluminum.

FIGS. 2-4B are drawn to scale, although other relative dimensions may be used.

FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. An article of manufacture, comprising:
a differential carrier, the differential carrier including a forward surface having an input, the forward surface including a plurality of vertical ribs, wherein the differential carrier is comprised of cast aluminum, wherein the plurality of vertical ribs is asymmetrically positioned with respect to a central axis of the input, wherein the differential carrier further comprises a left trunnion and a right trunnion with respect to the forward surface, and wherein each of the plurality of vertical ribs merges with one of the left and right trunnions.

2. The article of claim 1, wherein the differential carrier further includes a plurality of radial ribs radiating radially outward from the input, and wherein at least one of the radial ribs intersects at least one of the plurality of vertical ribs at an end point.

3. The article of claim 1, wherein the left and right trunnions are aligned on a common axis.

4. An article of manufacture, comprising:
a differential carrier, the differential carrier including a forward surface having an input, the forward surface including a plurality of vertical ribs, wherein the differential carrier is comprised of cast aluminum, wherein the plurality of vertical ribs is asymmetrically positioned with respect to a central axis of the input, and wherein at least one of the plurality of ribs extends both forward from the forward surface and rearward from a rearward surface of the differential carrier.

5. The article of claim 4, wherein the rearward surface includes an opening and a mounting surface.

6. The article of claim 4, wherein the differential carrier further comprises a left trunnion and a right trunnion with respect to the forward surface.

7. The article of claim 6, wherein each of the plurality of vertical ribs merges with one of the left and right trunnions.

8. A system for a vehicle, comprising:
an input shaft rotating a first direction to drive the vehicle forward;
a differential carrier housing a differential, the differential carrier including a forward surface having an input for receiving the input shaft, the forward surface facing forward with respect to a front of the vehicle, the forward surface including a plurality of vertical ribs, the differential carrier having a left trunnion and a right trunnion for outputs of the differential, the plurality of vertical ribs being asymmetrically positioned with respect to a central axis of the input, with a greater number of ribs being positioned on a side receiving increased beam loading when the input shaft drives the vehicle in a forward direction, wherein the differential carrier is comprised of cast aluminum, and wherein each of the plurality of vertical ribs merges with one of the left and right trunnions.

9. The system of claim 8, wherein the differential carrier further includes a plurality of radial ribs radiating radially outward from the input, and wherein at least one of the radial ribs intersects at least one of the plurality of vertical ribs at an end point.

10. The system of claim 9, wherein at least one of the plurality of ribs extends both forward from the forward surface and rearward from a rearward surface of the differential carrier.

11. The system of claim 10, wherein the rearward surface includes an opening and a mounting surface.

12. The system of claim 11, wherein the left and right trunnions are aligned on a common axis, the system further comprising left and right drive wheels, each drive wheel coupled to a respective trunnion via one or more drive shafts.

13. A system for a vehicle, comprising:
an input shaft rotating a first direction to drive the vehicle forward;
a cast aluminum differential carrier housing a differential, the differential carrier including a forward surface having an input for receiving the input shaft, the forward surface facing forward with respect to a front of the vehicle, the forward surface including a plurality of vertical ribs, the differential carrier having a left trunnion and a right trunnion for outputs of the differential, the plurality of vertical ribs being asymmetrically positioned with respect to a central axis of the input, with a greater number of ribs being positioned on a side receiving increased beam loading when the input shaft drives the vehicle in a forward direction, wherein each of the plurality of vertical ribs merge with one of the trunnions, wherein the differential carrier further includes a plurality of radial ribs radiating radially outward from the input, wherein at least one of the radial ribs intersects at least one of the plurality of vertical ribs at an end point, wherein the radial ribs are only on the forward surface, and not a rearward surface, wherein each of the plurality of ribs extends both forward from the forward surface and rearward from the rearward surface.

14. The system of claim 13, wherein the rearward surface includes an opening and a mounting surface.

15. The system of claim 14, wherein at least one radial rib intersects two vertical ribs.

16. The system of claim 15, wherein the vertical ribs extend to a top on a top side of the carrier.

* * * * *